(12) United States Patent
Homma

(10) Patent No.: US 8,168,341 B2
(45) Date of Patent: *May 1, 2012

(54) FUEL CELL AND FUEL CELL STACK

(75) Inventor: Hiroki Homma, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 1215 days.

This patent is subject to a terminal disclaimer.

(21) Appl. No.: 11/919,695

(22) PCT Filed: May 15, 2006

(86) PCT No.: PCT/JP2006/310075
§ 371 (c)(1),
(2), (4) Date: Oct. 31, 2007

(87) PCT Pub. No.: WO2006/123797
PCT Pub. Date: Nov. 23, 2006

(65) Prior Publication Data
US 2009/0098439 A1    Apr. 16, 2009

(30) Foreign Application Priority Data

May 16, 2005 (JP) ................................. 2005-142732

(51) Int. Cl.
*H01M 8/06* (2006.01)
(52) U.S. Cl. ........ 429/415; 429/408; 429/428; 429/433; 429/440
(58) Field of Classification Search .................. 429/415, 429/433, 440, 408, 428
See application file for complete search history.

(56) References Cited

U.S. PATENT DOCUMENTS

| | | | |
|---|---|---|---|
| 5,330,858 A | 7/1994 | Shundou et al. | |
| 6,124,053 A * | 9/2000 | Bernard et al. | 429/415 |
| 6,258,474 B1 | 7/2001 | Diethelm et al. | |
| 6,432,567 B1 | 8/2002 | Doggwiler et al. | |
| 7,442,463 B2 * | 10/2008 | Homma | 429/456 |
| 7,871,730 B2 * | 1/2011 | Ogawa et al. | 429/412 |
| 2004/0234837 A1 | 11/2004 | Dan | |
| 2004/0247987 A1 | 12/2004 | Izumi et al. | |
| 2005/0142423 A1 * | 6/2005 | Homma et al. | 429/38 |
| 2005/0142425 A1 * | 6/2005 | Homma | 429/38 |
| 2005/0287415 A1 * | 12/2005 | Hatoh et al. | 429/38 |

FOREIGN PATENT DOCUMENTS

| | | |
|---|---|---|
| EP | 1 309 027 A2 | 5/2003 |
| WO | WO-2005/064724 A2 | 7/2005 |

* cited by examiner

*Primary Examiner* — Patrick Ryan
*Assistant Examiner* — Lucas O Donnell
(74) *Attorney, Agent, or Firm* — Nelson Mullins Riley & Scarborough LLP; Anthony A. Laurentano

(57) ABSTRACT

A fuel cell includes a plurality of electrolyte electrode assemblies and a pair of separators sandwiching the electrolyte electrode assemblies. A fuel gas supply channel formed by a channel member fixed to the separator is connected to a fuel gas inlet formed in an inner end of a trapezoidal section. Unburned hydrogen in an exhaust fuel gas consumed in the reaction at the anode, and discharged from the fuel gas channel to an oxygen-containing gas supply unit, is mixed with an oxygen-containing gas before consumption, burned, and then supplied to an oxygen-containing gas channel.

10 Claims, 16 Drawing Sheets

→ FUEL GAS
→ OXYGEN-CONTAINING GAS

FUEL CELL AND FUEL CELL STACK

RELATED APPLICATIONS

This application is a 35 U.S.C. 371 national stage filing of International Application No. PCT/JP2006/310075, filed 15 May 2006, which claims priority to Japan Patent Application No. 2005-142732 filed on 16 May 2005 in Japan. The contents of the aforementioned applications are hereby incorporated by reference.

TECHNICAL FIELD

The present invention relates to a fuel cell including an electrolyte electrode assembly and a pair of separators sandwiching the electrolyte electrode assembly. The electrolyte electrode assembly includes an anode, a cathode, and an electrolyte interposed between the anode and the cathode. Further, the present invention relates to a fuel cell stack formed by stacking a plurality of the fuel cells.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

The operating temperature of the fuel cell is high, about 800° C. or more. Therefore, if a fuel gas consumed in the fuel cell, containing unburned gas discharged to the area around the fuel cell is mixed with an oxygen-containing gas to burn the unburned gas, the temperature of the fuel cell stack may increase significantly. In this case, the operation of the fuel cell stack cannot be performed stably.

In an attempt to address the problem, for example, Japanese Laid-Open Patent Publication No. 5-41241 discloses a solid oxide fuel cell as shown in FIG. 16. In a heat insulating container 1 of the fuel cell, a stack chamber 3 containing stacks 2, an exhaust gas combustion chamber 4, and a heat exchanger chamber 5 containing a heat exchanger 5a are provided. An exhaust fuel gas and an exhaust oxygen-containing gas flow into a fuel gas discharge chamber 3a and an oxygen-containing gas discharge chamber 3b, and the fuel gas discharge chamber 3a and the oxygen-containing gas discharge chamber 3b are provided hermetically from each other in the stack chamber 3. The fuel gas discharge chamber 3a and the oxygen-containing gas discharge chamber 3b are connected to a combustion chamber 4 through exhaust gas passages 6a formed in a heat insulating wall 6.

In the conventional technique, the fuel gas and the oxygen-containing gas heated to the temperature about 700° C. to 900° C. by the heat exchanger 5a are supplied respectively to the stacks 2, and consumed in the power generation reaction in the stacks 2.

The exhaust fuel gas and the exhaust oxygen-containing gas discharged from the stacks 2 to the fuel gas discharge chamber 3a and the oxygen-containing gas discharge chamber 3b flow into the combustion chamber 4 through the exhaust gas passages 6a. Therefore, in the combustion chamber 4, the exhaust fuel gas and the exhaust oxygen-containing gas are mixed together, and burned. The burned gas is supplied to the heat exchanger 5a, and heat exchange with the fuel gas and the oxygen-containing gas before consumption is carried out. Then, the burned gas is discharged to the outside.

However, in the conventional technique, the mixed exhaust gas of the exhaust fuel gas and the exhaust oxygen-containing gas discharged from the stacks 2 has a considerably high temperature. The unburned hydrogen in the mixed exhaust gas is afterburned in the combustion chamber 4, i.e., some of the hydrogen which has not been burned in the stacks 2 is burned after it is discharged from the stacks 2 to further increase the temperature of the mixed exhaust gas. Therefore, the temperature of the combustion chamber 4 is considerably higher than the operating temperature of the stacks 2. The combustion chamber 4 needs to be fabricated uneconomically using expensive heat resistant alloy or the like.

Further, the mixed exhaust gas having the considerably high temperature is supplied to the heat exchanger chamber 5, and heat exchange between the mixed exhaust gas and the oxygen-containing gas and the fuel gas before consumption is carried out. Therefore, in order to make it possible to exchange sufficient heat energy between the mixed exhaust gas having the high temperature and the reactant gases (oxygen-containing gas and fuel gas) having the low temperature, the heat exchanger 5a needs to be considerably large. Further, since the heat exchanger 5a is exposed to the mixed exhaust gas having the high temperature, the heat exchanger 5a needs to be fabricated using expensive heat resistant alloy. Accordingly, the overall size of the fuel cell is large, and the fuel cell is fabricated uneconomically.

DISCLOSURE OF INVENTION

A main object of the present invention is to provide a fuel cell and a fuel cell stack with simple and economical structure in which heat exchange is carried out suitably, and improvement in the thermal efficiency is achieved.

The present invention relates to a fuel cell including an electrolyte electrode assembly and a pair of separators sandwiching the electrolyte electrode assembly. The electrolyte electrode assembly includes an anode, a cathode, and an electrolyte interposed between the anode and the cathode. The fuel cell comprises first protrusions forming a fuel gas channel provided on one surface of the separator for supplying a fuel gas in one direction along an electrode surface of the anode, and second protrusions forming an oxygen-containing gas channel provided on the other surface of the separator for supplying an oxygen-containing gas in the other direction opposite to the direction along an electrode surface of the cathode.

The fuel cell further comprises a channel member provided on the one surface or the other surface of the separator to form a fuel gas supply channel connected to a fuel gas supply unit and the fuel gas channel, and a fuel gas inlet provided at a position spaced from the center of the electrolyte electrode assembly toward the fuel gas supply unit. The fuel gas inlet is connected to the fuel gas supply channel for supplying the fuel gas into the fuel gas channel. The fuel cell further comprises an oxygen-containing gas supply unit for mixing an exhaust fuel gas consumed in reaction at the anode and discharged from the fuel gas channel, with the oxygen-containing gas before consumption, and supplying the mixed gas to the oxygen-containing gas channel.

Further, the fuel cell further comprises an exhaust gas channel for discharging the fuel gas and the oxygen-containing gas consumed in the reaction in the electrolyte electrode assembly as an exhaust gas in a stacking direction of the electrolyte electrode assembly and the separators. Preferably, the fuel gas supply unit for supplying the fuel gas before consumption in the stacking direction is provided hermetically inside the exhaust gas channel, and the fuel gas supply channel connects the fuel gas channel and the fuel gas supply unit, and is provided along the separator surface that intersects the exhaust gas channel extending in the stacking direction. The fuel gas flowing through the fuel gas supply channel is heated by the hot exhaust gas flowing through the exhaust gas channel. Therefore, the efficiency in the power generation reaction is improved effectively.

Further, preferably, the exhaust gas channel is provided at the center of the separators. By the hot exhaust gas flowing through the exhaust gas channel, it is possible to heat the entire fuel cell uniformly.

Further, preferably, the fuel gas supply unit is provided hermetically at the center of the exhaust gas channel. The fuel gas supplied to the fuel gas supply unit is heated by the hot exhaust gas flowing through the exhaust gas channel. Therefore, improvement in the power generation efficiency is achieved desirably.

Further, preferably, the oxygen-containing gas supply unit supplies the mixed gas of the oxygen-containing gas before consumption and the exhaust fuel gas to the oxygen-containing gas supply channel from the outer circumferential surface of the electrolyte electrode assembly. In the structure, since the fuel gas and the oxygen-containing gas flow in a counterflow manner, the power generation reaction occurs smoothly, and the power generation efficiency is increased.

Further, preferably, the first protrusion is a ring shaped protrusion, and the second protrusion is formed inside the ring shaped protrusion. In the structure, the first and second protrusions hold the electrolyte electrode assembly, and collect electricity from the electrolyte electrode assembly reliably.

Further, preferably, a plurality of electrolyte electrode assemblies are arranged along a circle concentric with the center of the separators. In the structure, it is possible to prevent heat distortion or unwanted stress from being generated in the electrolyte electrode assembly.

Further, the present invention relates a fuel cell stack formed by staking a plurality of fuel cells each including a plurality of electrolyte electrode assemblies and a pair of separators sandwiching the electrolyte electrode assemblies. Each electrolyte electrode assembly includes an anode, a cathode, and an electrolyte interposed between the anode and the cathode. The fuel cell comprises first protrusions forming a fuel gas channel provided on one surface of the separator for supplying a fuel gas in one direction along an electrode surface of the anode, and second protrusions forming an oxygen-containing gas channel provided on the other surface of the separator for supplying an oxygen-containing gas in the other direction opposite to the one direction along an electrode surface of the cathode.

The fuel cell stack further comprises a channel member provided on the one surface or the other surface of the separator to form a fuel gas supply channel connected to a fuel gas supply unit and the fuel gas channel, and a fuel gas inlet provided at a position spaced from the center of the electrolyte electrode assembly toward the fuel gas supply unit. The fuel gas inlet is connected to the fuel gas supply channel for supplying the fuel gas into the fuel gas channel. The fuel cell further comprises an oxygen-containing gas supply unit for mixing an exhaust fuel gas consumed in reaction at the anode and discharged from the fuel gas channel, with the oxygen-containing gas before consumption, and supplying the mixed gas to the oxygen-containing gas channel, and an exhaust gas channel for discharging the fuel gas and the oxygen-containing gas consumed in the reaction in the electrolyte electrode assembly as an exhaust gas in a stacking direction of the electrolyte electrode assembly and the separators.

BEST MODE FOR CARRYING OUT THE INVENTION

Figure 1:
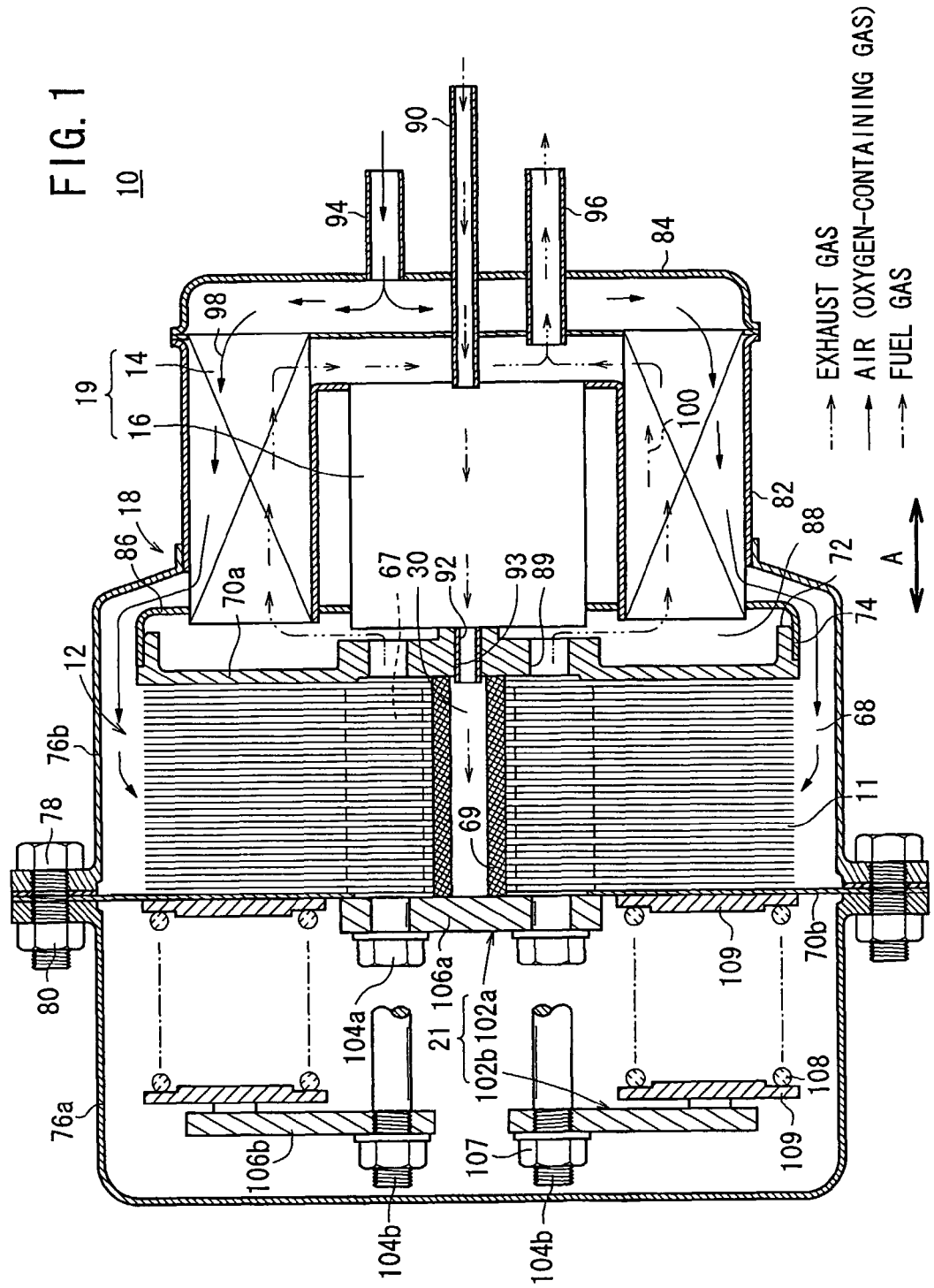
FIG. 1 is a partial cross sectional view showing a fuel cell system according to a first embodiment of the present invention.
Figure 2:
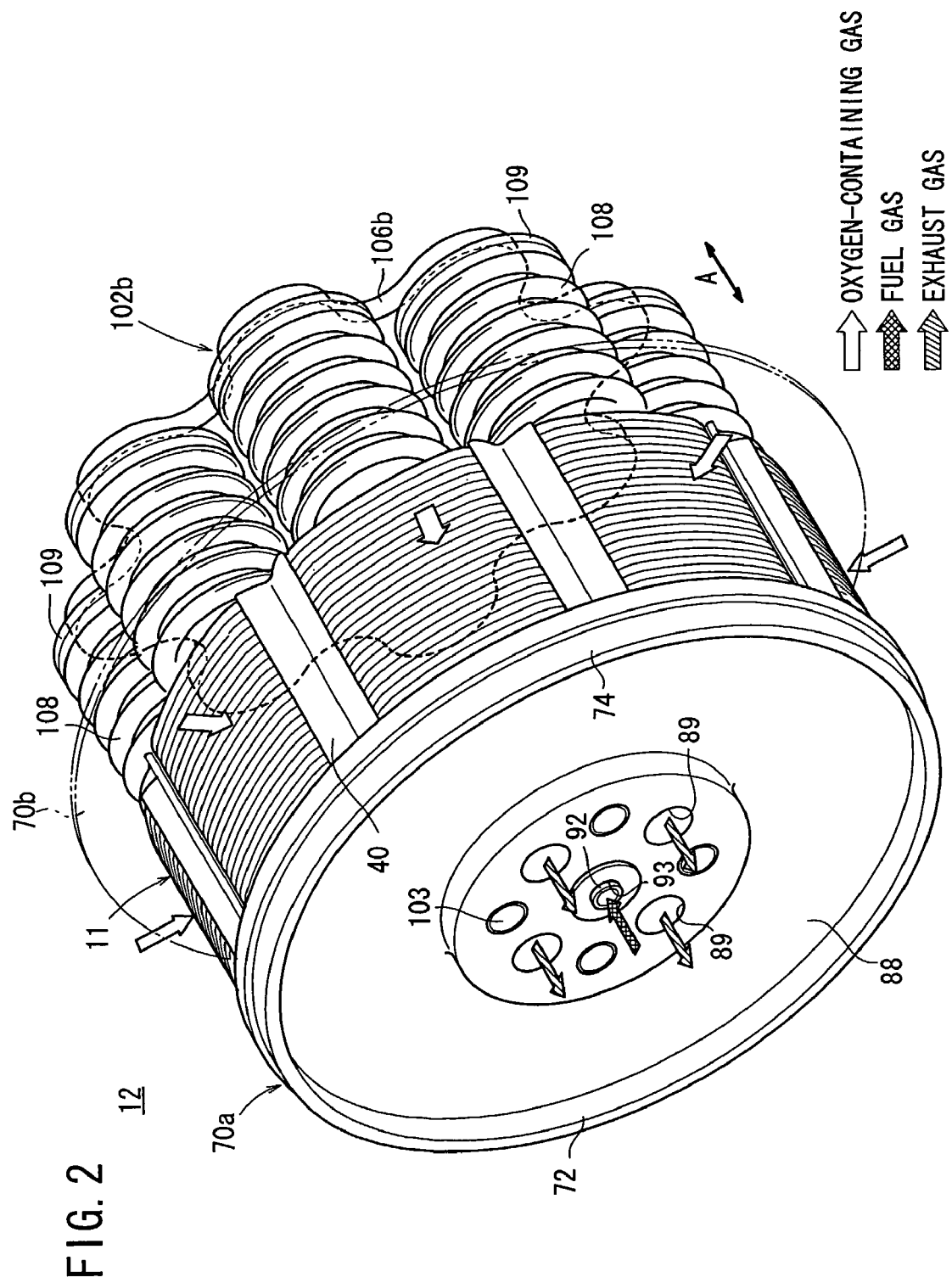
FIG. 2 is a perspective view schematically showing a fuel cell stack of the fuel cell system.

FIG. 1 is a partial cross sectional view showing a fuel cell system 10 including fuel cells 11 according to a first embodiment of the present invention. FIG. 2 is a perspective view schematically showing a fuel cell stack 12 formed by stacking a plurality of the fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats an oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
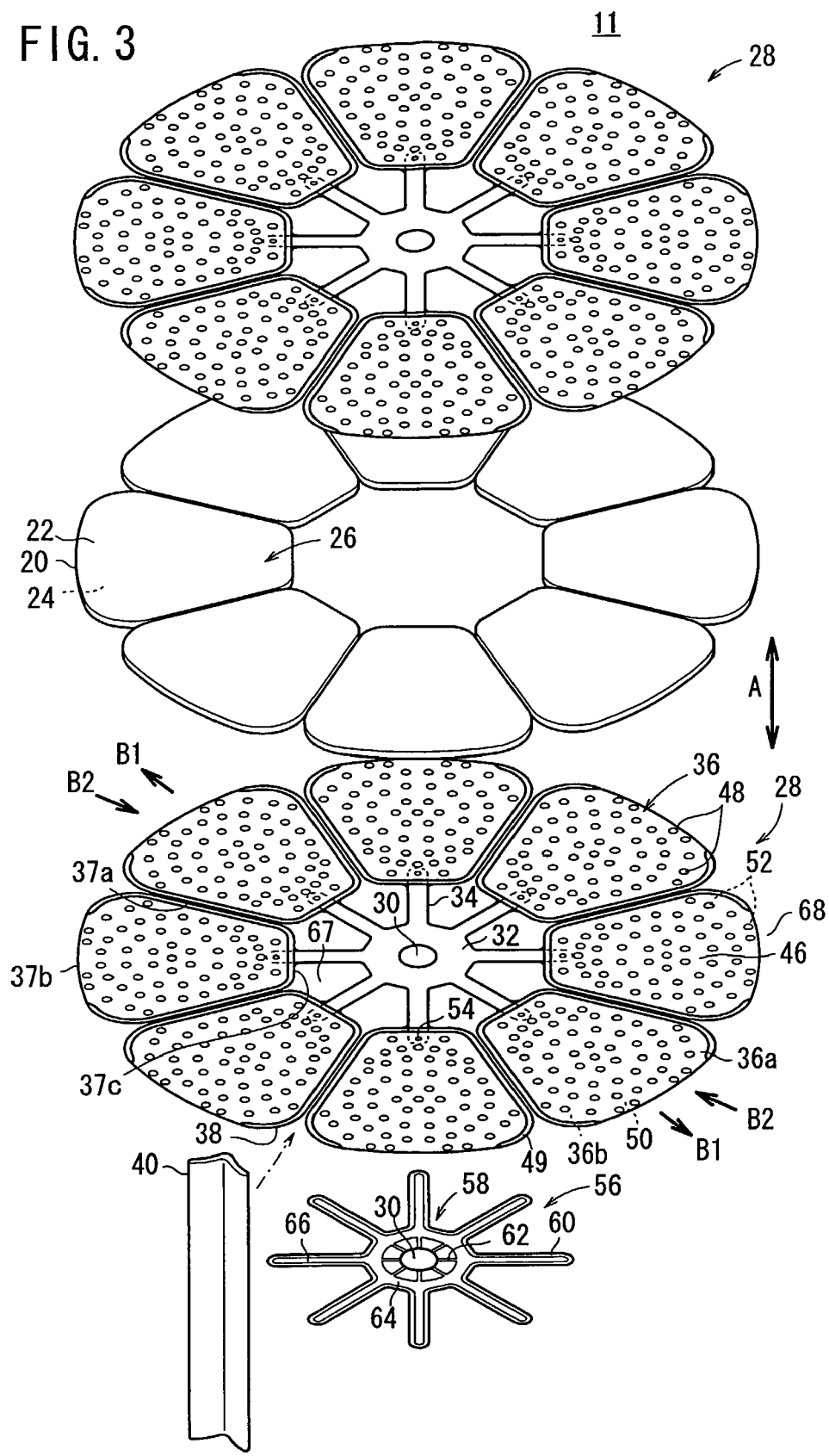
FIG. 3 is an exploded perspective view schematically showing a fuel cell of the fuel cell stack.
Figure 4:
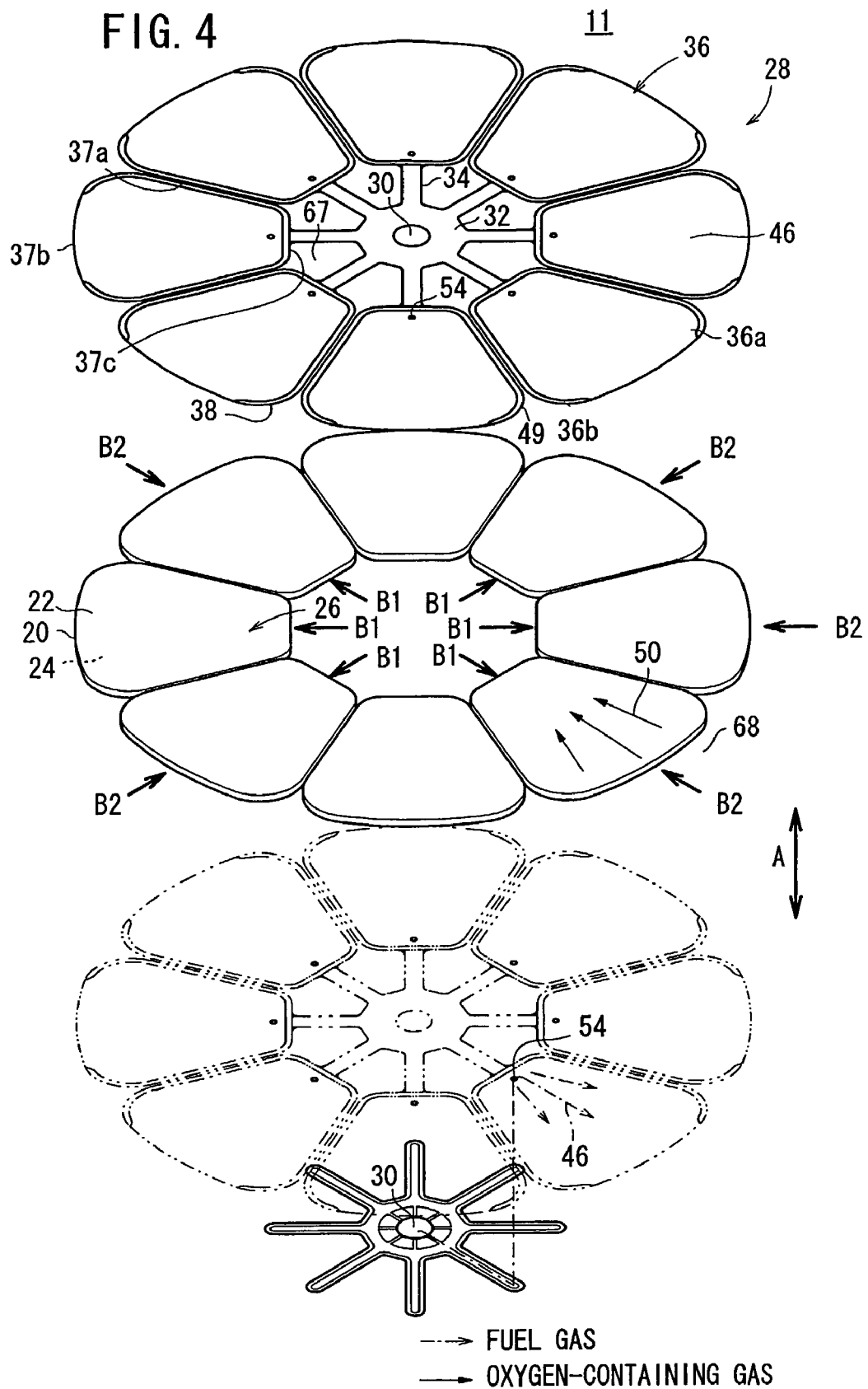
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 is a thin plate having a trapezoidal shape. A barrier layer (not shown) is provided at least at the outer circumferential edge of the electrolyte electrode assembly 26 (outer end of the separator 28) for preventing the entry of the oxygen-containing gas.

A plurality of, e.g., eight electrolyte electrode assemblies 26 are sandwiched between a pair of separators 28 to form the fuel cell 11. The eight electrolyte electrode assemblies 26 are arranged along a circle concentric with a fuel gas supply passage (fuel gas supply unit) 30 extending through the center of the separators 28.

In FIG. 3, for example, each of the separators 28 comprises a single metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with trapezoidal sections 36 through a plurality of first bridges 34. The first bridges 34 extend radially outwardly from the first small diameter end portion 32 at equal angles (intervals).

The trapezoidal section 36 and the electrolyte electrode assembly 26 have substantially the same shape. The trapezoidal section 36 includes opposite side portions 37a, an arc-shaped outer circumferential portion 37b, and a substantially straight inner portion 37c. The width between the opposite side portions 37a is narrowed in the flow direction of the oxygen-containing gas indicated by an arrow B2. At both ends of the outer circumferential portion 37b, relatively large curved portions (R portions) 38 are formed. Baffle plates 40 extend through spaces formed between the curved portions 38 of the adjacent trapezoidal sections 36 for preventing entry of the oxygen-containing gas between the trapezoidal sections 36.

Figure 5:
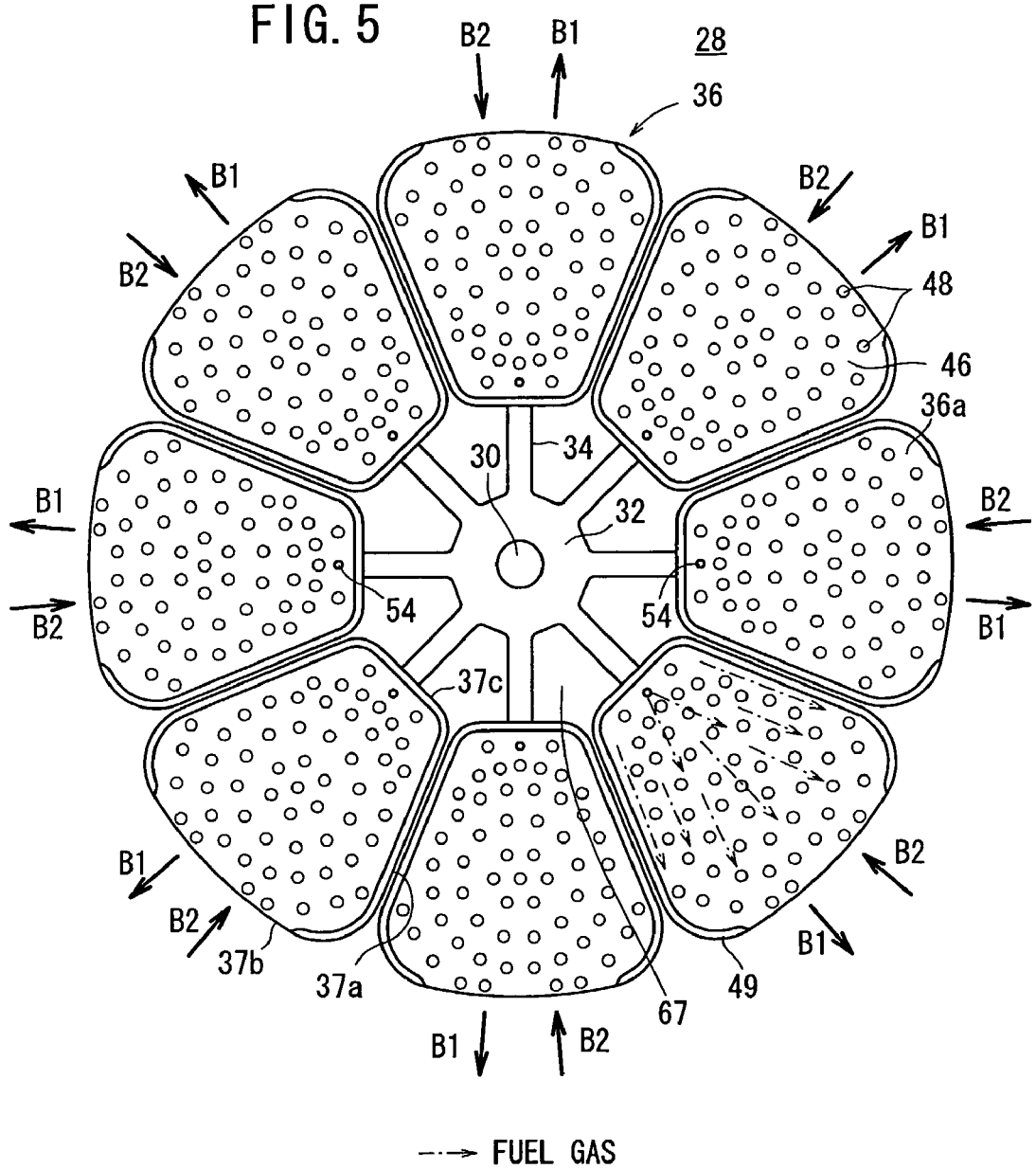
FIG. 5 is a view showing one surface of a separator.

As shown in FIGS. 3 and 5, each of the trapezoidal sections 36 has first protrusions 48 on its surface 36a which contacts the anode 24. The first protrusions 48 form a fuel gas channel 46 for supplying the fuel gas along an electrode surface of the anode 24 in a direction indicated by an arrow B1. A seal 49 is formed around the outer edge of the trapezoidal section 36, except the outer circumferential portion 37b.

Figure 6:
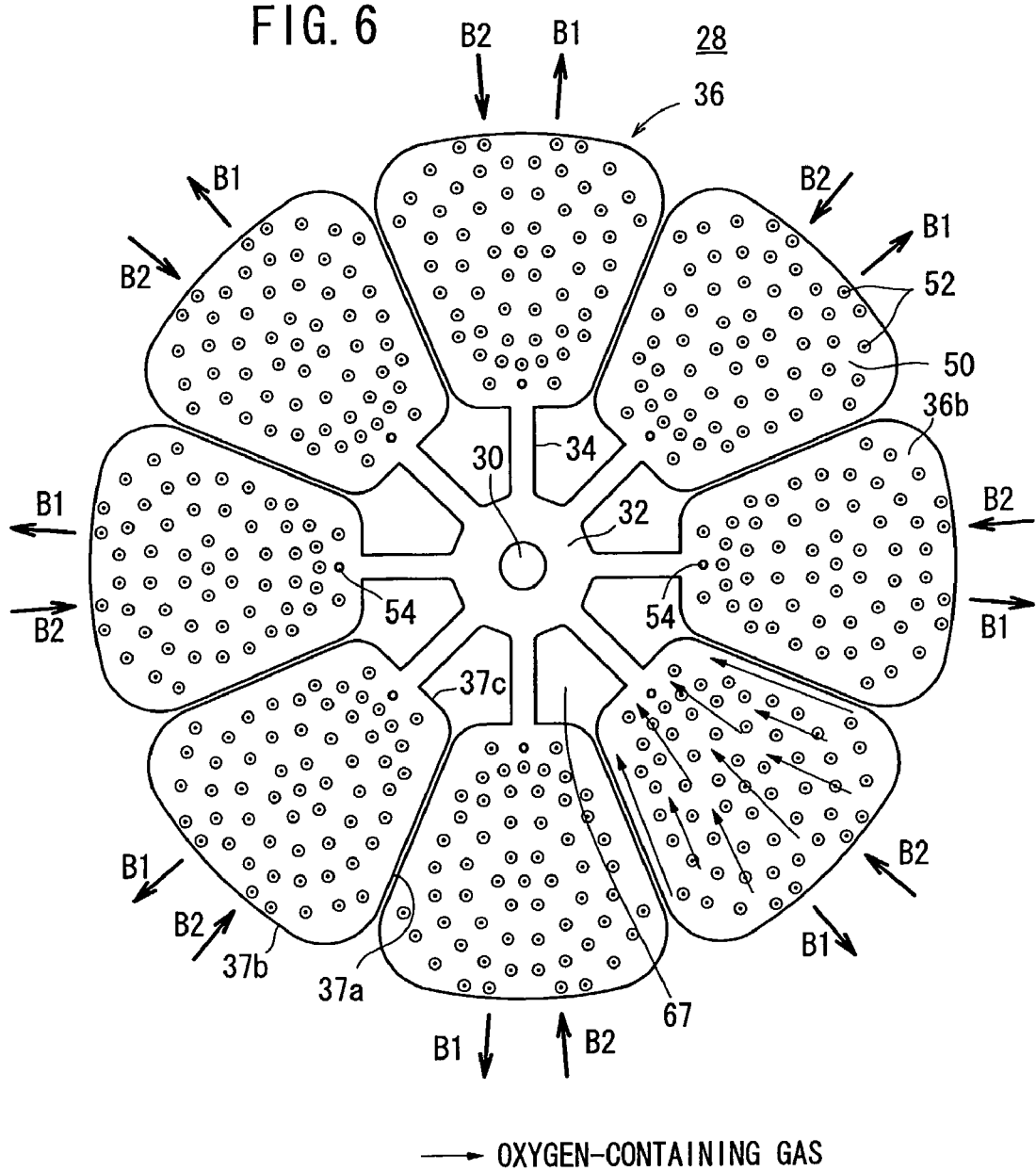
FIG. 6 is a view showing the other surface of the separator.

Each of the trapezoidal sections 36 has second protrusions 52 on its surface 36b which contacts the cathode 22. The second protrusions 52 form an oxygen-containing gas channel 50 for supplying the oxygen-containing gas along an electrode surface of the cathode 22 (see FIG. 6). Preferably, anti-oxidation material such as La—Co based material is coated on the surface 36b.

Figure 7:
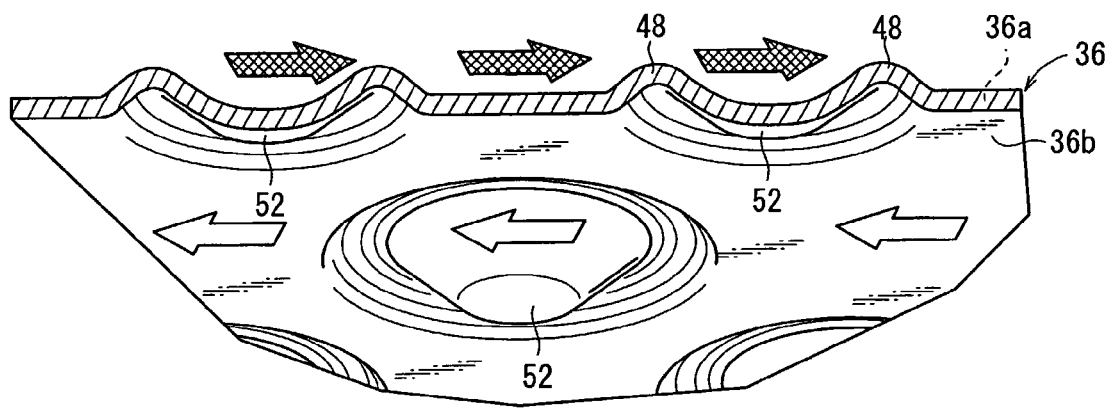
FIG. 7 is a perspective view showing first and second protrusions formed on the separator.
Figure 8:
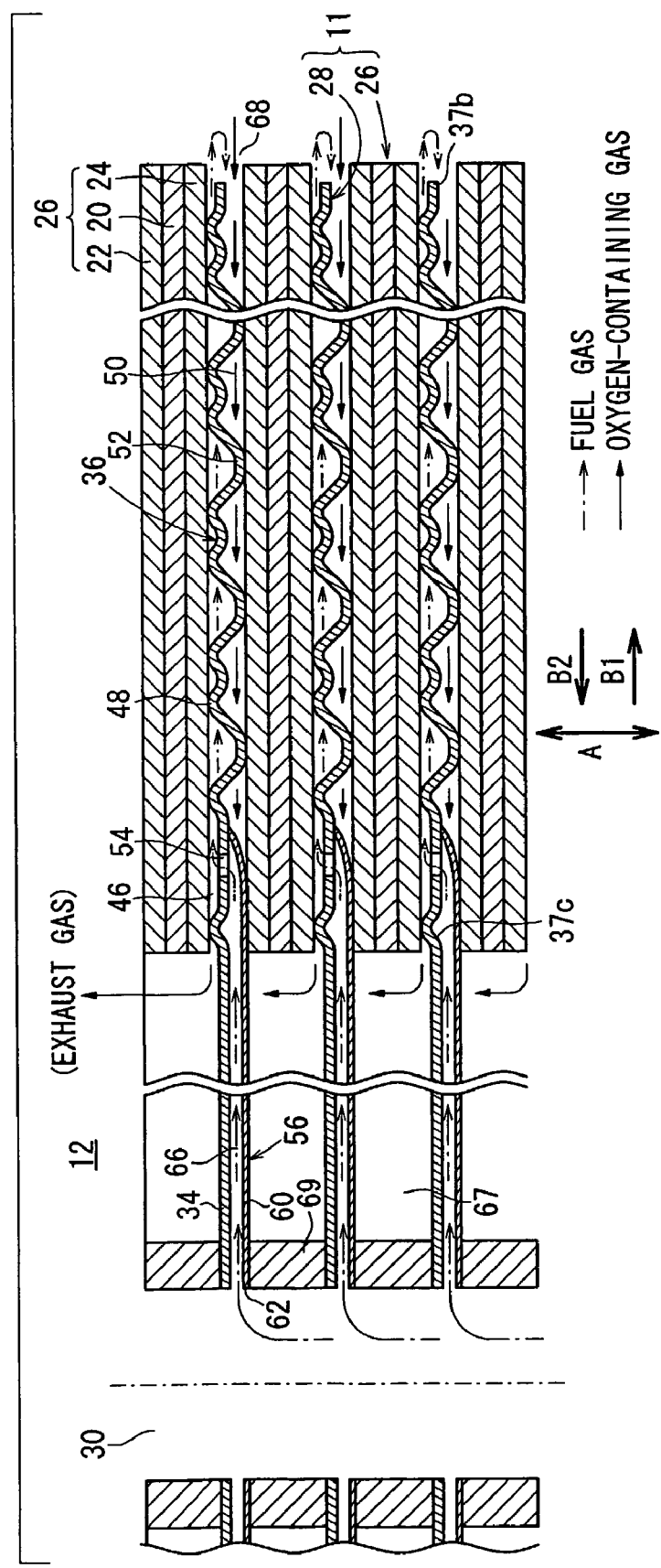
FIG. 8 is a cross sectional view showing the fuel cell stack.
Figure 9:
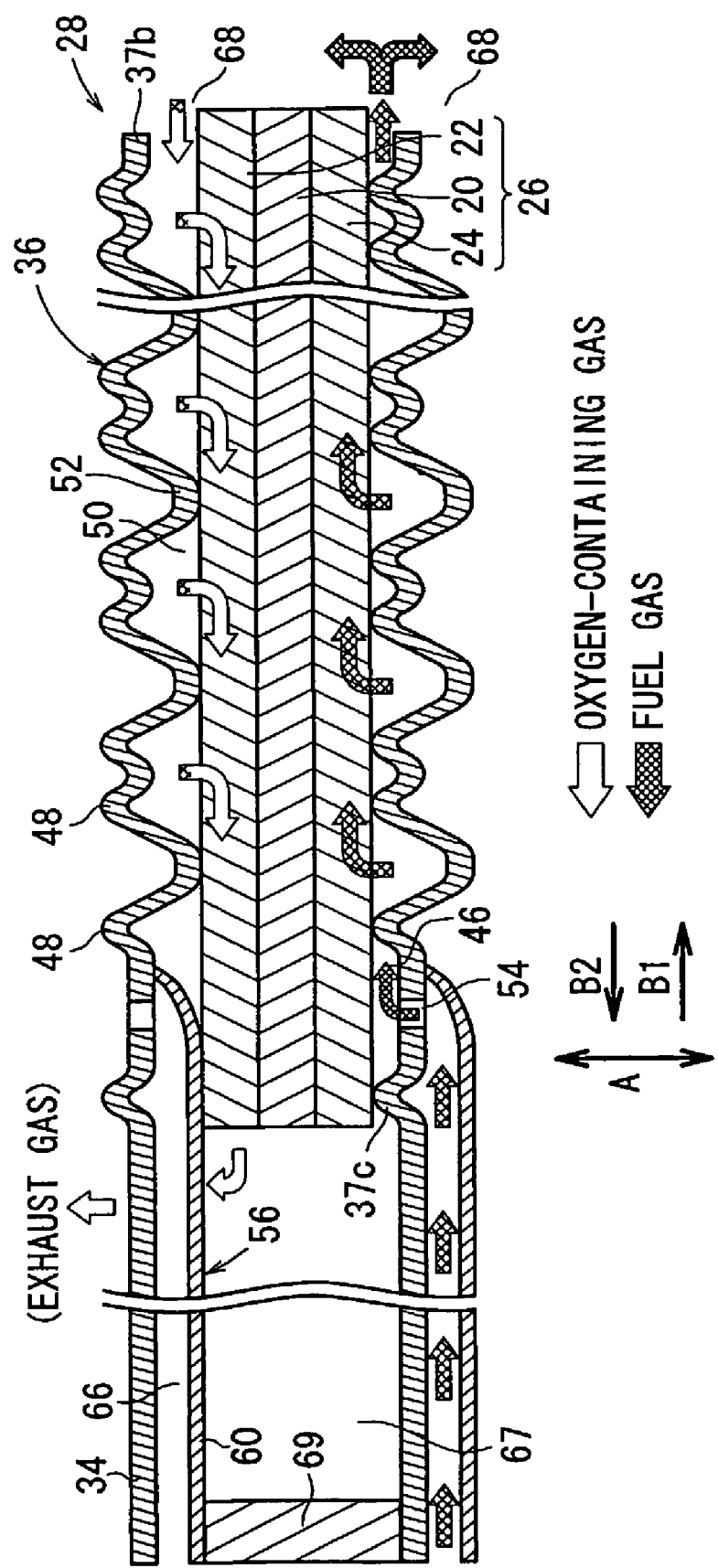
FIG. 9 is a cross sectional view schematically showing operation of the fuel cell.

As shown in FIG. 7, the first and second protrusions 48, 52 are coaxial with each other. The first protrusions 48 are ring shaped protrusions, and the second protrusions 52 are mountain shaped protrusions. The second protrusions (mountain shaped protrusions) 52 are surrounded by the first protrusions (ring shaped protrusions) 48. As shown in FIGS. 8 and 9, the height of the first protrusion 48 is smaller than the height of the second protrusion 52. In the structure, the volume of the oxygen-containing gas channel 50 is larger than the volume of the fuel gas channel 46.

Alternatively, the first protrusions 48 may be mountain shaped protrusions, and the second protrusions 52 may be ring shaped protrusions. In this case, it is preferable that the height of the ring shaped protrusion is larger than the height of the mountain shaped protrusion.

As shown in FIG. 4, the fuel gas is supplied through the fuel gas channel 46 in the direction indicated by the arrow B1 (in one direction) along an electrode surface of the anode 24, and the oxygen-containing gas is supplied through the oxygen-containing gas channel 50 in the direction indicated by the arrow B2 (in the other direction) along an electrode surface of the cathode 22.

As shown in FIGS. 3 to 6, a fuel gas inlet 54 is provided in each of the trapezoidal sections 36, at a position spaced from the center of the anode 24 toward the fuel gas supply passage 30, i.e., at a position near the inner portion 37c of the trapezoidal section 36 for supplying the fuel gas to the fuel gas channel 46.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each front end of the second bridges 60 is fixed to the separator 28, from the first bridge 34 to the surface 36b of the trapezoidal section 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas.

A fuel gas supply channel 66 is formed between the first and second bridges 34, 60. The fuel gas supply channel 66 is connected to the fuel gas channel 46 through the slits 62 and the recess 64. Each channel member 56 has a curved cross section. In the structure, when a load in the stacking direction indicated by the arrow A is applied, the second bridge 60 is elastically deformed in the stacking direction.

As shown in FIGS. 8 and 9, the oxygen-containing gas channel 50 is connected to an oxygen-containing gas supply unit 68. The oxygen-containing gas is supplied in the direction indicated by the arrow B2 through the space between the outer circumferential edge of the electrolyte electrode assembly 26 and the outer circumferential portion 37b of the trapezoidal section 36. The oxygen-containing gas supply unit 68 functions to mix the exhaust fuel gas consumed in the reaction at the anode 24 and discharged from the fuel gas channel 46 with the oxygen-containing gas before consumption, i.e., functions to allow burning (afterburning) of the unburned hydrogen in the exhaust fuel gas, and supply the burned gas to the oxygen-containing gas channel 50.

As shown in FIG. 8, insulating seals 69 for sealing the fuel gas supply passage 30 are provided between the separators 28. For example, the insulating seals 69 are made of mica material, or ceramic material. An exhaust gas channel 67 extends through the fuel cells 11 in the stacking direction inside the inner portions 37c of the respective trapezoidal sections 36.

As shown in FIGS. 1 and 2, the fuel cell stack 12 includes a plurality of the fuel cells 11 stacked together, and end plates 70a, 70b provided at opposite ends in the stacking direction. Each of the end plates 70a, 70b has a circular disk shape. The fuel cells 11 are tightened together by the load applying mechanism 21.

The casing 18 includes a first case unit 76a containing the load applying mechanism 21 and a second case unit 76b containing the fuel cell stack 12 (see FIG. 1). The end plate 70b and an insulating member are sandwiched between the first case unit 76a and the second case unit 76b. The insulating member is provided on the side of the second case unit 76b. The joint portion between the first case unit 76a and the second case unit 76b is tightened by screws 78 and nuts 80. The end plate 70b functions as a heat barrier for preventing entry of the hot exhaust gas or the hot air from the fluid unit 19 into the load applying mechanism 21.

An end of a ring shaped wall plate 82 is joined to the second case unit 76b, and a head plate 84 is fixed to the other end of the wall plate 82. The fluid unit 19 is provided symmetrically with respect to the central axis of the fuel cell stack 12. Specifically, the substantially cylindrical reformer 16 is provided coaxially inside the substantially ring shaped heat exchanger 14.

A wall plate 86 is fixed to a groove 74 around the end plate 70a to form a chamber unit 88 between the end plate 70a and the wall plate 86. The heat exchanger 14 and the reformer 16 are directly connected to the chamber unit 88. The chamber unit 88 is connected to the exhaust gas channel 67 through holes 89 of the end plate 70a.

A fuel gas supply pipe 90 and a reformed gas supply pipe 92 are connected to the reformer 16. The fuel gas supply pipe 90 extends to the outside from the head plate 84. The reformed gas supply pipe 92 is inserted into a hole 93 of the end plate 70a, and connected to the fuel gas supply passage 30.

An air supply pipe 94 and an exhaust gas pipe 96 are connected to the head plate 84. A channel 98 extending from the air supply pipe 94, and directly opened to the oxygen-containing gas supply unit 68 through the heat exchanger 14, and a channel 100 extending from the exhaust gas channel 67 of the fuel cell stack 12 to the exhaust gas pipe 96 through the heat exchanger 14 are provided in the casing 18.

The load applying mechanism 21 includes a first tightening unit 102a for applying a first tightening load T1 to a region around (near) the fuel gas supply passage 30 and a second tightening unit 102b for applying a second tightening load T2 to the electrolyte electrode assemblies 26. The second tightening load T2 is smaller than the first tightening load T1 (T1>T2).

As shown in FIGS. 1 and 2, the first tightening unit 102a includes first tightening bolts 104a, which are short and screwed into screw holes 103 formed along one diagonal line of the end plate 70a. The first tightening bolts 104a extend in the stacking direction of the fuel cells 11, and engage a first presser plate 106a. The first tightening bolts 104a are provided in the exhaust gas channel 67 extending through the separators 28. The first presser plate 106a is a narrow plate, and engages the central position of the separator 28 to cover the fuel gas supply passage 30.

The second tightening unit 102b includes second tightening bolts 104b, which are long and screwed into screw holes 103 formed along the other diagonal line of the end plate 70a. Ends of the second tightening bolts 104b extend through a second presser plate 106b having a curved outer section. Nuts 107 are fitted to the ends of the second tightening bolts 104b. The second tightening bolts 104b are provided in the exhaust gas channel 67 extending through the separators 28. Springs 108 and spring seats 109 are provided in respective circular portions of the second presser plate 106b, at positions corresponding to the electrolyte electrode assemblies 26 on the trapezoidal sections 36 of the fuel cell 11. For example, the springs 108 are ceramics springs.

Operation of the fuel cell system 10 will be described below.

As shown in FIG. 1, a fuel (methane, ethane, propane, or the like) and, as necessary, water are supplied from the fuel gas supply pipe 90, and an oxygen-containing gas (hereinafter referred to as the "air") is supplied from the air supply pipe 94.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slits 62 in the separator 28 of each fuel cell 11 (FIG. 8).

The fuel gas flows along the fuel gas supply channel 66, and flows into the fuel gas channel 46 from the fuel gas inlets 54 of the trapezoidal sections 36. The fuel gas inlets 54 are formed at positions deviated toward the inner ends of the anodes 24 of the electrolyte electrode assemblies 26. Thus, the fuel gas is supplied from the fuel gas inlets 54 to the inner ends the anodes 24, and flows outwardly toward the outer ends of the anodes 24 along the fuel gas channel 46 in the direction indicated by the arrow B1 (see FIG. 9).

The oxygen-containing gas supplied to the oxygen-containing gas supply unit 68 around each fuel cell 11 flows into the space between the outer circumferential edge of the electrolyte electrode assembly 26 and the outer circumferential edge of the trapezoidal section 36 in the direction indicated by the arrow B2, and flows toward the oxygen-containing gas channel 50. As shown in FIGS. 8 and 9, in the oxygen-containing gas channel 50, the oxygen-containing gas flows from the outer circumferential edge (outer circumferential edge of the separator 28) to the other outer circumferential edge (central region of the separator 28) of, i.e., from one end to the other end of the cathode 22 of the electrolyte electrode assembly 26.

Thus, in the electrolyte electrode assembly 26, the fuel gas flows from inner side to the outer circumferential side on the electrode surface of the anode 24, and the oxygen-containing gas flows from the outer circumferential side to the inner side on the electrode surface of the cathode 22 (see FIG. 9). At this time, oxygen ions flow through the electrolyte 20 toward the anode 24 for generating electricity by electrochemical reactions.

In the first embodiment, the fuel gas flows along the electrode surface of the anode 24 in the direction indicated by the arrow B1. Reaction of the hydrogen in the fuel gas occurs in the electrolyte electrode assembly 26. Thus, the temperature of the fuel gas is increased, and the fuel gas is discharged through the outer circumferential edges of the separators 28 to the outside, i.e., to the oxygen-containing gas supply unit 68.

The exhaust fuel gas containing unburned hydrogen discharged from the anode 24 to the oxygen-containing gas supply unit 68 is mixed with the unconsumed oxygen supplied to the oxygen-containing gas supply unit 68. Therefore, in the oxygen-containing gas supply unit 68, the unburned hydrogen is burned and diluted. The temperature is adjusted to a predetermined temperature required for operation of the fuel cell 11.

After the oxygen-containing gas is mixed with the exhaust fuel gas, and the unburned hydrogen is burned (afterburned), the oxygen-containing gas flows into the oxygen-containing gas channel 50 from the outside of the separator 28. The oxygen-containing gas flows along the cathode 22 in the direction indicated by the arrow B2. That is, the oxygen-containing gas and the fuel gas flow in a counterflow manner. The oxygen-containing gas is discharged to the exhaust gas channel 67 provided on the inner side of the separator 28.

As described above, in the first embodiment, after the unburned hydrogen in the exhaust fuel gas discharged from the fuel gas channel 46 is mixed with the oxygen-containing gas, and burned in the oxygen-containing gas supply unit 68, it is supplied to the oxygen-containing gas channel 50. Therefore, it is possible to utilize the heat generated in afterburning of the hydrogen to directly heat the separators 28. Thus, improvement in the heat efficiency is achieved easily, and the start-up time is reduced advantageously.

Further, the hot exhaust gas immediately after afterburning is not supplied to the heat exchanger 14. Therefore, heat exchange amount required in the heat exchanger 14 is reduced. Thus, it is possible to reduce the size of the heat exchanger 14, and reduce the overall size of the fuel cell system 10.

Further, the unburned hydrogen in the exhaust fuel gas discharged to the oxygen-containing gas supply unit 68 is burned near the outer circumferential region of the separator 28, and diluted by a large amount of the oxygen-containing gas. Thus, the burned gas is cooled to the predetermined inlet temperature required for power generation of the fuel cell stack 12, and supplied to the electrolyte electrode assembly 26. Therefore, the space surrounding the fuel cell stack 12 is not heated to the high temperature entirely. In the structure, it is possible to reduce the amount of the heat insulating material used in the fuel cell system 10. It is possible to decrease the maximum temperatures of the reactant gases (fuel gas and oxygen-containing gas) flowing inside the fuel cell system 10.

Therefore, in the first embodiment, the loss of thermal energy due to heat radiation is reduced. As a result, significant reduction in the amount of heat resistant material such as heat resistant alloy required in components such as the channel wall surface, the heat exchanger 14, or the like which contact the reactant gas is achieved economically.

Further, the fuel gas flows along the electrode surface of the anode 24 and the oxygen-containing gas flows along the electrode surface of the cathode 22 in the counterflow manner. Therefore, the power generation reaction occurs uniformly over substantially the entire surfaces of the electrolyte electrode assembly 26. The uniform temperature distribution and improvement in the power generation efficiency are achieved. Further, it is possible to desirably prevent the electrolyte electrode assembly 26 from being damaged due to the heat stress.

Further, in the first embodiment, the first and second bridges 34, 60 are provided in the exhaust gas channel 67. The fuel gas supply channel 66 is formed between the first and second bridges 34, 60, and the fuel gas supply channel 66 is provided along the separator surface that intersects the exhaust gas channel 67 extending in the stacking direction. Therefore, the fuel gas flowing through the fuel gas supply channel 66 is heated effectively by the waste heat from the exhaust gas channel 67, and the thermal efficiency is improved.

Further, the exhaust gas channel 67 extends through the center of the separators 28. In the structure, the fuel cell system 10 is heated uniformly by heat transfer from the central region, and thus, improvement in the power generation efficiency is achieved. Further, the fuel gas supply passage 30 is provided at the center of the exhaust gas channel 67 hermetically, and the waste heat is utilized to heat the fuel gas to be supplied to the electrolyte electrode assemblies 26. Thus, improvement in the power generation efficiency is achieved.

Further, the first protrusions 48 of the fuel gas channel 46 are ring shaped protrusions, and the second protrusions 52 of the oxygen-containing gas channel 50 are mountain shaped protrusions formed inside the ring shaped protrusions. In the structure, the first and second protrusions 48, 52 hold the electrolyte electrode assembly 26, and collect electricity from the electrolyte electrode assembly 26 reliably.

Further, the electrolyte electrode assemblies 26 are arranged along a circle concentric with the center of the separators 28. In the structure, it is possible to effectively prevent generation of heat distortion or unwanted stress in the electrolyte electrode assemblies 26.

Figure 10:
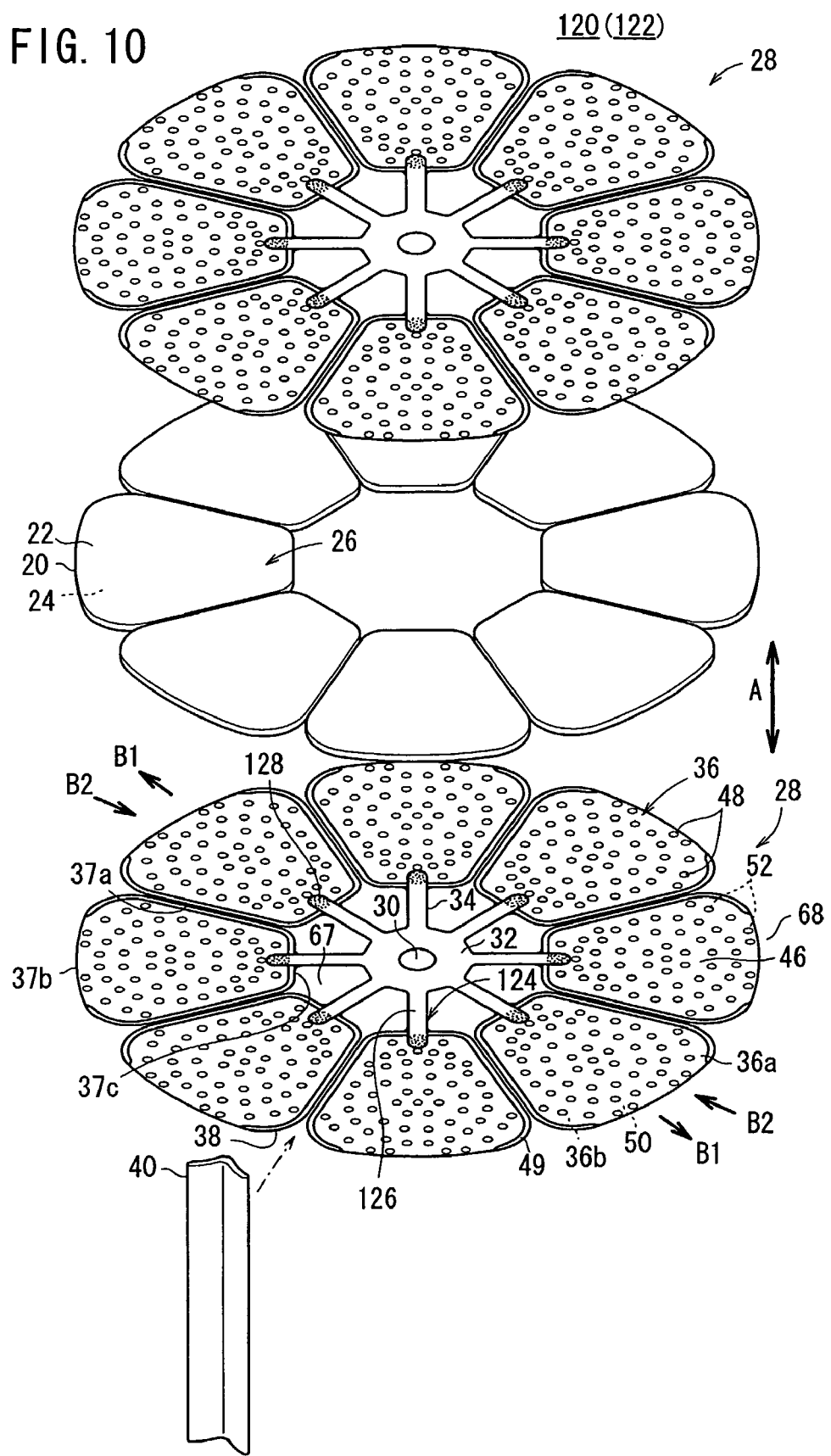
FIG. 10 is an exploded perspective view showing a fuel cell according to a second embodiment of the present invention.
Figure 11:
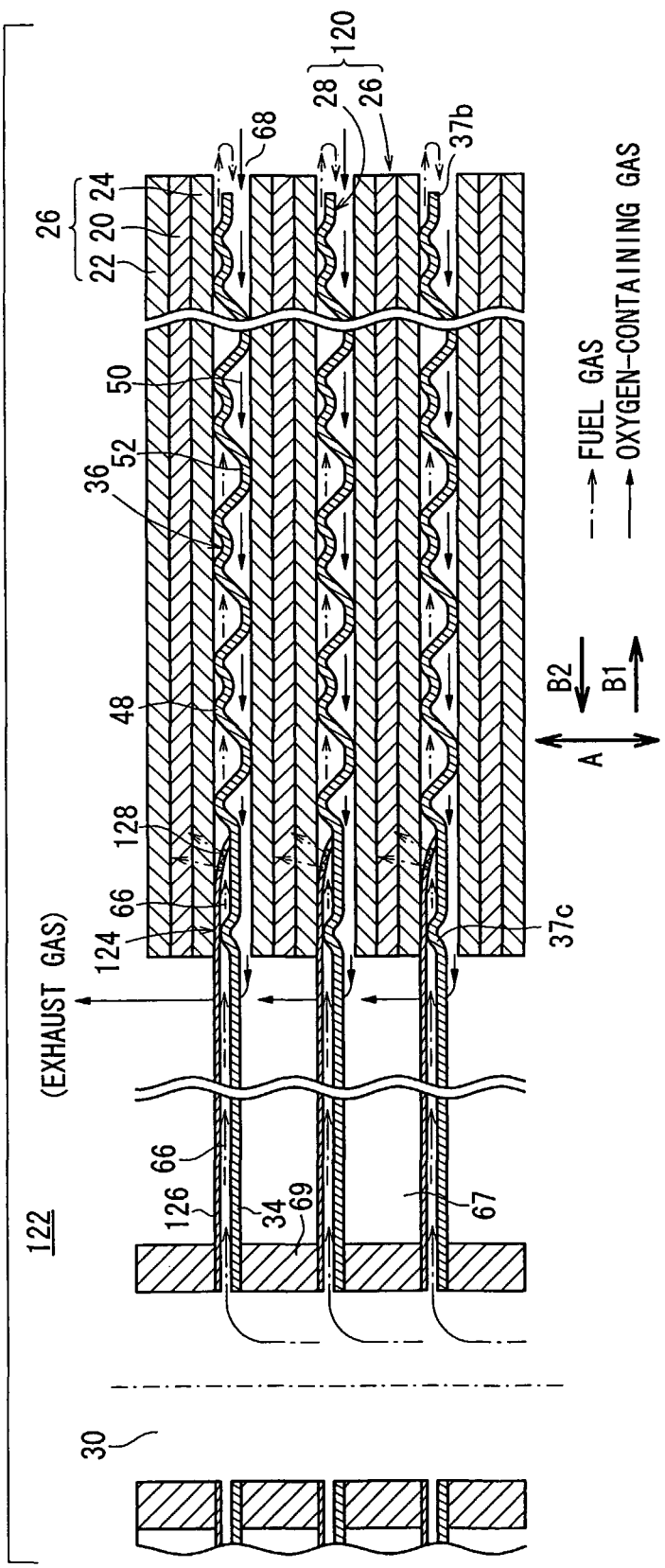
FIG. 11 is a cross sectional view showing a fuel cell stack formed by stacking a plurality of the fuel cells.
Figure 12:
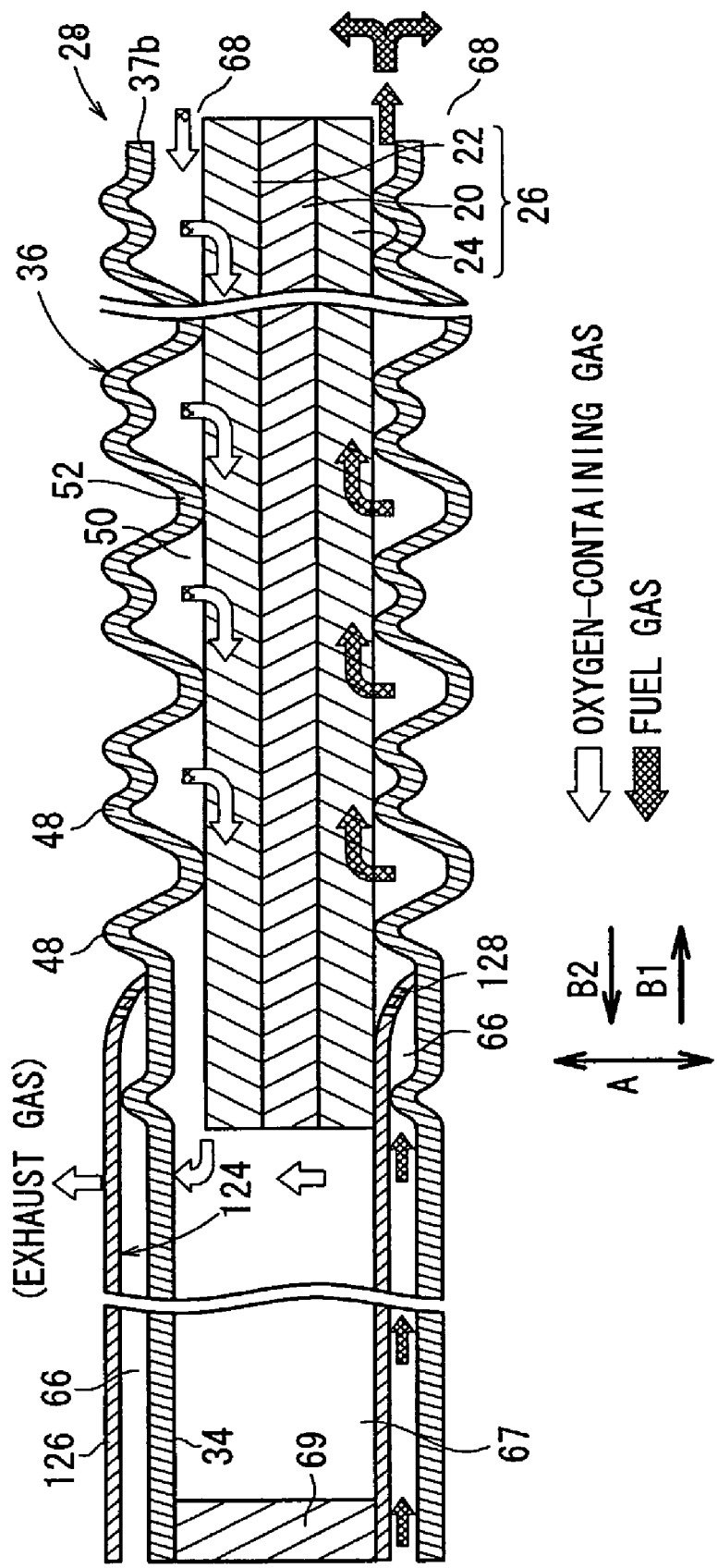
FIG. 12 is a cross sectional view schematically showing operation of the fuel cell.

FIG. 10 is an exploded perspective view showing a fuel cell 120 according to a second embodiment of the present invention. FIG. 11 is a cross sectional view showing a fuel cell stack 122 formed by stacking a plurality of the fuel cells 120. FIG. 12 is a cross sectional view schematically showing operation of the fuel cell 120. The constituent elements that are identical to those of the fuel cell 11 according to the first embodiment are labeled with the same reference numeral, and description thereof will be omitted. Also in third and fourth embodiments as described later, the constituent elements that are identical to those of the fuel cell 11 according to the first embodiment are labeled with the same reference numeral, and description thereof will be omitted.

A channel member 124 is fixed to each of the separators 28 of the fuel cell 120 on a surface facing the anodes 24. The channel member 124 has second bridges 126 fixed to first bridges 34 of the separator 28. A fuel gas supply channel 66 is formed between the first and second bridges 34, 126. Each front end of the second bridges 126 terminates at a position near the inner end of the anode 24 of the electrolyte electrode assembly 26. At the front end of the second bridge 126, a plurality of fuel gas inlets 128 are formed, and the fuel gas inlets 128 are opened to the anode 24. The fuel gas inlets 54 according to the first embodiment are not provided in the trapezoidal sections 36 in each of the separators 28.

In the second embodiment, the fuel gas supplied to the fuel gas supply passage 30 flows along the fuel gas supply channel 66 formed in each space between the separator 28 and the channel member 124, and flows from the fuel gas inlets 128 formed at the front end of the channel member 124 to the anode 24.

Thus, it is possible to supply the fuel gas from the inner side to the outer circumferential side of the anode 24 even more desirably and uniformly, and the efficiency in the power generation reaction is improved advantageously. Further, it is not necessary to provide the fuel gas inlets 54 in the trapezoidal sections 36 in each of the separators 28. Therefore, the separator 28 has simple structure, and production cost of the separator 28 is reduced easily.

Figure 13:
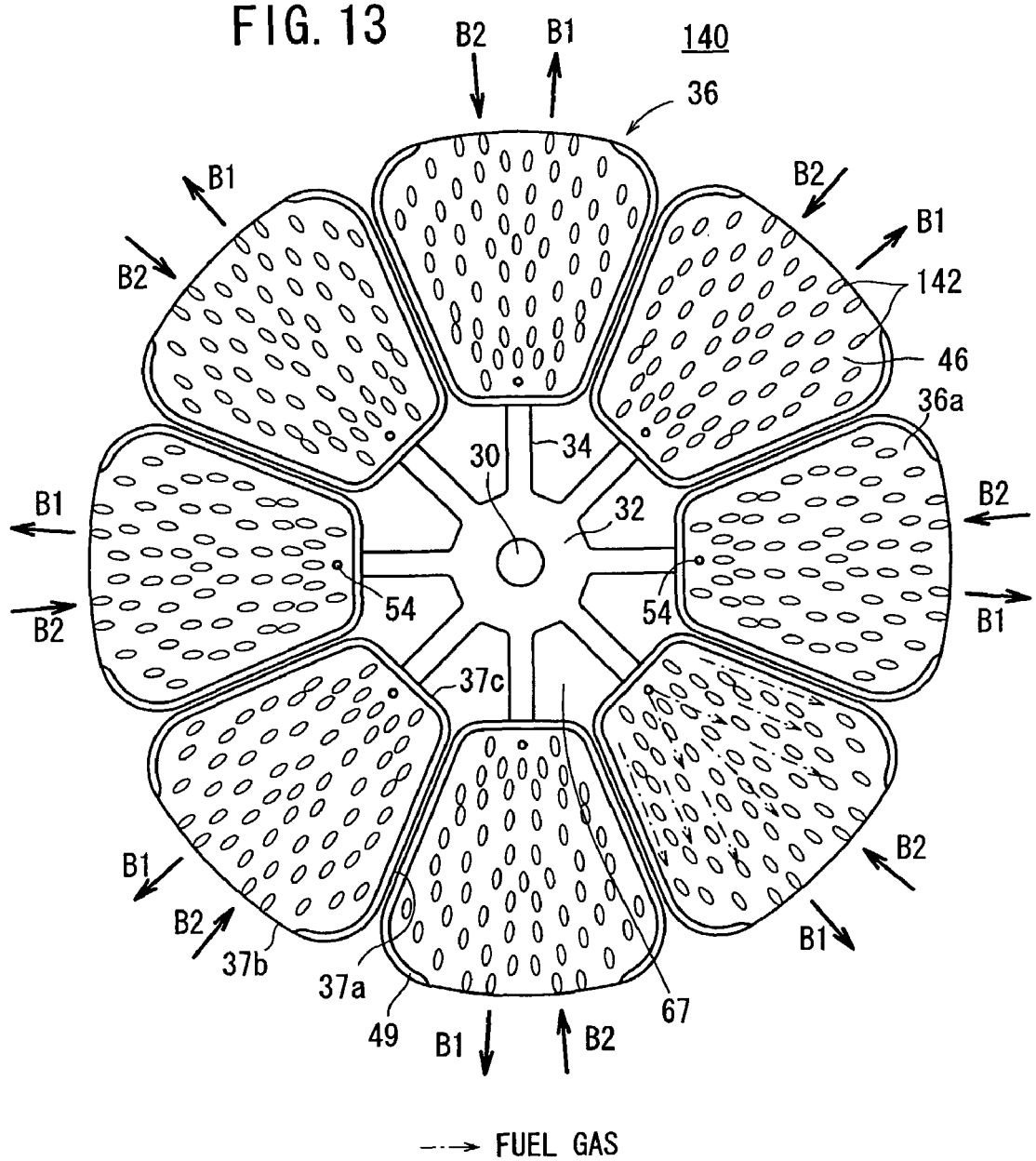
FIG. 13 is a view showing one surface of a separator of a fuel cell according to a third embodiment of the present invention.

FIG. 13 is a front view showing a separator 140 of a fuel cell according to a third embodiment of the present invention.

In the separator 140, first protrusions 142 of the fuel gas channel 46 have an ellipse (or oval) shape instead of the circular shape. In the structure, the first protrusions 142 are inclined respectively along the flow direction of the fuel gas. Though not shown, second protrusions of the oxygen-containing gas channel also have an ellipse (or oval) shape.

Thus, in the third embodiment, the flow of the fuel gas flowing along the fuel gas channel 46 is rectified. The fuel gas flows uniformly from the outer region of the anode 24 toward the center of the fuel cell. In particular, simply by arranging the first protrusions 142 having the oval shape in parallel with the flow direction, improvement in the rectifying function is achieved advantageously.

Figure 14:
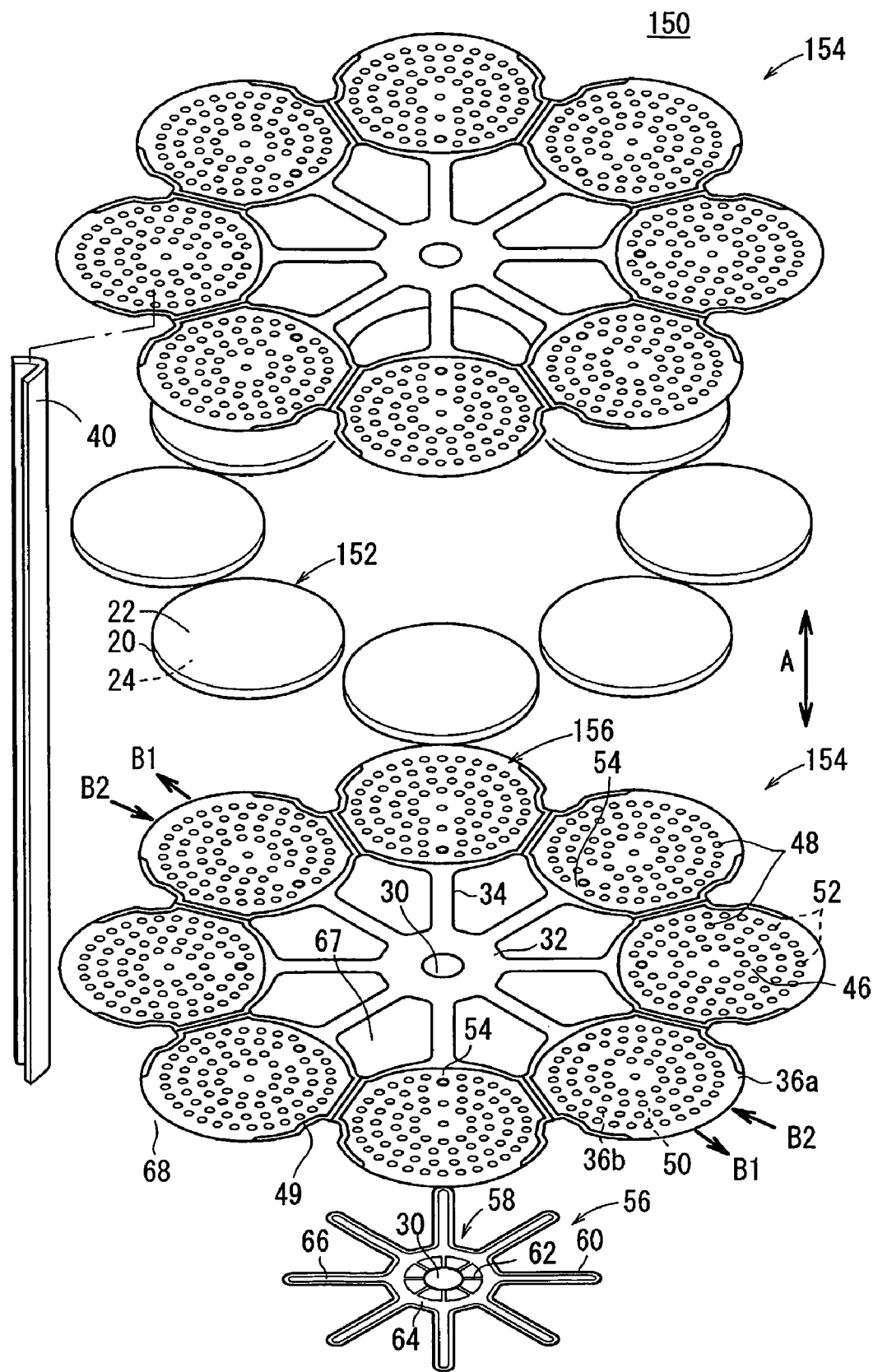
FIG. 14 is an exploded perspective view showing a fuel cell according to a fourth embodiment of the present invention.
Figure 15:
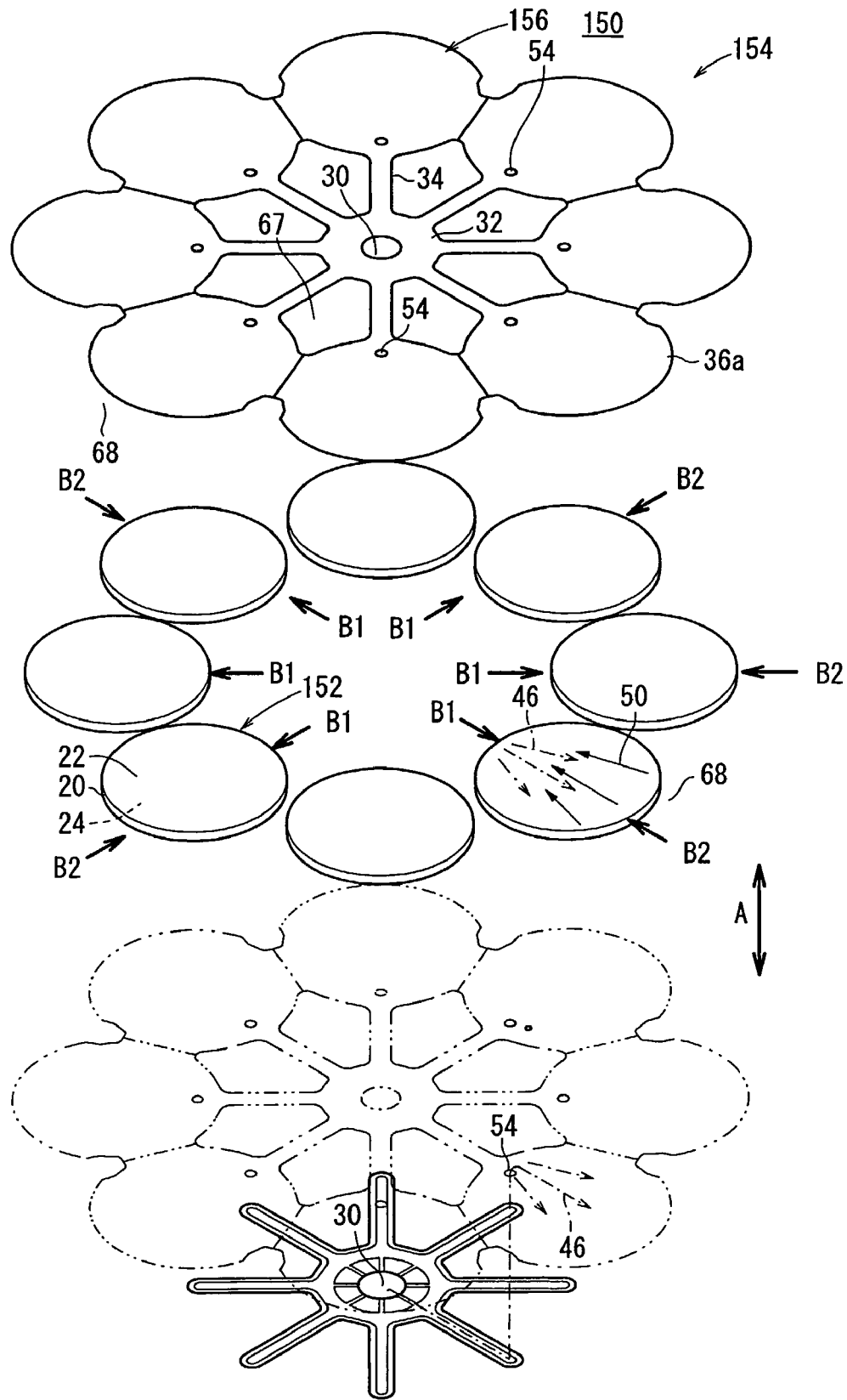
FIG. 15 is a partial exploded perspective view showing gas flows in the fuel cell.
Figure 16:
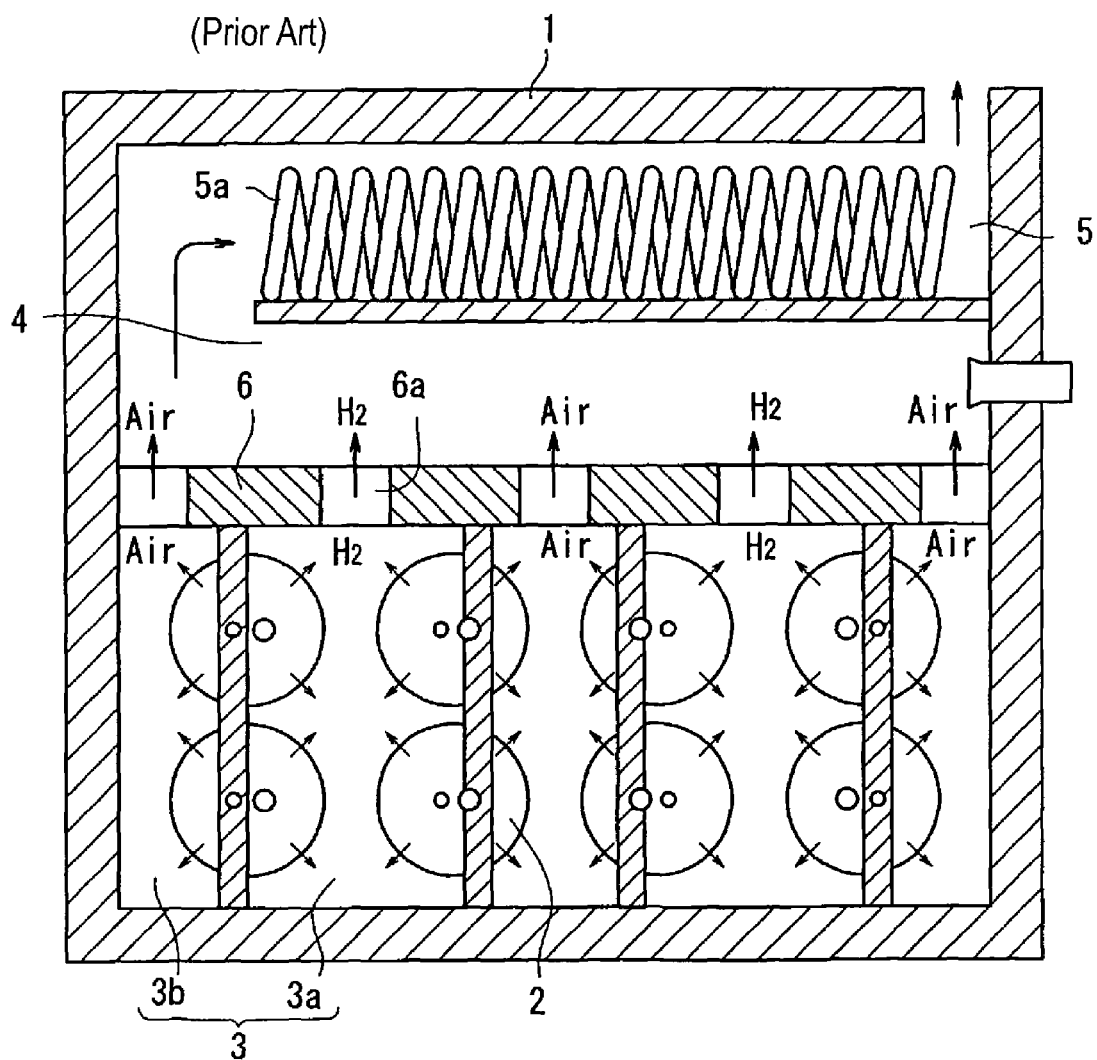
FIG. 16 is a view schematically showing structure of a conventional fuel cell.

FIG. 14 is an exploded perspective view showing a fuel cell 150 according to a fourth embodiment of the present invention. FIG. 15 is a partial exploded perspective view showing gas flows in the fuel cell 150.

The fuel cell 150 is formed by sandwiching electrolyte electrode assemblies 152 each having a thin circular disk shape between a pair of separators 154. In the separator 154, a first small diameter end portion 32 is integral with circular disks 156 through a plurality of first bridges 34 extending radially from the first small diameter end portion 32. The circular disk 156 and the electrolyte electrode assembly 152 have substantially the same shape (circular disk shape). The fuel gas inlets 54 are formed on the inner side (end portion near the fuel gas supply passage 30) in each of the circular disks 156. The circular disk 156 has first protrusions 48 forming the fuel gas channel 46 and second protrusions 52 forming the oxygen-containing gas channel 50. The first and second protrusions 48, 52 have a circular or oval shape.

In the fourth embodiment, the fuel gas flows along the fuel gas channel 46 in the direction indicated by the arrow B1, and the oxygen-containing gas flows along the oxygen-containing gas channel 50 in the direction indicated by the arrow B2. That is, the fuel gas and the oxygen-containing gas flow in a counterflow manner. In the structure, the unburned hydrogen in the exhaust fuel gas discharged from the fuel gas channel 46 is mixed with the oxygen-containing gas and burned in the oxygen-containing gas supply unit 68, and then, supplied to the oxygen-containing gas channel 50. Thus, the separator 154 is heated directly by the heat generated in afterburning of the hydrogen. Accordingly, the same advantages as in the case of the first embodiment can be achieved. For example, improvement in the thermal efficiency is achieved easily.

Industrial Applicability

According to the present invention, the unburned hydrogen in the exhaust fuel gas discharged from the fuel gas channel is mixed with the oxygen-containing gas and burned (afterburned) in the oxygen-containing gas supply unit, and then, supplied to the oxygen-containing gas channel. Thus, the separator can be heated directly by the heat generated in afterburning. Accordingly, improvement in the thermal efficiency is achieved, and the startup time can be reduced.

Further, since the hot exhaust gas immediately after afterburning of the hydrogen is not supplied to the heat exchanger, the heat exchange amount required in the heat exchanger is reduced. Therefore, it is possible to reduce the size of the heat exchanger. Accordingly, the overall size of the fuel cell is reduced significantly.

Further, the unburned hydrogen in the exhaust fuel gas discharged from the fuel gas channel is burned near the outer circumferential end of the separator. The burned gas is diluted by a large amount of the oxygen-containing gas and cooled to a predetermined temperature before it is supplied to the electrolyte electrode assembly. Thus, in comparison with the case in which the entire fuel cell is warmed, the amount of the heat insulating material such as heat resistant alloy used in the fuel cell is reduced economically.

The invention claimed is:

1. A fuel cell including an electrolyte electrode assembly and a pair of separators sandwiching said electrolyte electrode assembly, said electrolyte electrode assembly including an anode, a cathode, and an electrolyte interposed between said anode and said cathode, said fuel cell comprising:
    first protrusions forming a fuel gas channel provided on one surface of said separator for supplying a fuel gas in one direction along an electrode surface of said anode;
    second protrusions forming an oxygen-containing gas channel provided on the other surface of said separator for supplying an oxygen-containing gas in the other direction opposite to the one direction along an electrode surface of said cathode;
    a channel member provided on the one surface or the other surface to form a fuel gas supply channel connected to a fuel gas supply unit and said fuel gas channel;
    a fuel gas inlet provided at a position spaced from the center of said electrolyte electrode assembly toward said fuel gas supply unit, said fuel gas inlet being connected to said fuel gas supply channel for supplying the fuel gas into said fuel gas channel;
    an oxygen-containing gas supply unit for mixing an exhaust fuel gas consumed in reaction at said anode and discharged from said fuel gas channel, with the oxygen-containing gas before consumption, and supplying the mixed gas to said oxygen-containing gas channel;
    an exhaust gas channel for discharging the fuel gas and the oxygen-containing gas consumed in the reaction in said electrolyte electrode assembly as an exhaust gas in a stacking direction of said electrolyte electrode assembly and said separators, wherein
    said fuel gas supply unit for supplying the fuel gas before consumption in the stacking direction is provided hermetically inside said exhaust gas channel; and
    said fuel gas supply channel connects said fuel gas channel and said fuel gas supply unit, and is provided along the separator surface that intersects said exhaust gas channel extending in the stacking direction.

2. A fuel cell according to claim 1, wherein said exhaust gas channel is provided at the center of said separators.

3. A fuel cell according to claim 2, wherein said fuel gas supply unit is provided hermetically at the center of said exhaust gas channel.

4. A fuel cell according to claim 1, wherein said oxygen-containing gas supply unit supplies the mixed gas of the oxygen-containing gas before consumption and the exhaust fuel gas to said oxygen-containing gas supply channel from the outer circumferential surface of said electrolyte electrode assembly.

5. A fuel cell according to claim 1, wherein said first protrusion is a ring shaped protrusion, and said second protrusion is formed inside said ring shaped protrusion.

6. A fuel cell according to claim 1, wherein each of said first and second protrusions has an ellipse or oval shape with inclination along the flow direction of the fuel gas.

7. A fuel cell according to claim 1, wherein said fuel gas inlet is formed in said separator or said channel member.

8. A fuel cell according to claim 1, wherein a plurality of said electrolyte electrode assemblies are arranged along a circle concentric with the center of said separators.

9. A fuel cell stack formed by stacking a plurality of fuel cells each including a plurality of electrolyte electrode assemblies and a pair of separators sandwiching said electrolyte electrode assemblies, each of said electrolyte electrode assemblies including an anode, a cathode, and an electrolyte interposed between said anode and said cathode, said fuel cell comprising:
    first protrusions forming a fuel gas channel provided on one surface of said separator for supplying a fuel gas in one direction along an electrode surface of said anode;
    second protrusions forming an oxygen-containing gas channel provided on the other surface of said separator for supplying an oxygen-containing gas in the other direction opposite to the one direction along an electrode surface of said cathode;
    a channel member provided on the one surface or the other surface to form a fuel gas supply channel connected to a fuel gas supply unit and said fuel gas channel;
    a fuel gas inlet provided at a position spaced from the center of said electrolyte electrode assembly toward said fuel gas supply unit, said fuel gas inlet being connected to said fuel gas supply channel for supplying the fuel gas into said fuel gas channel;

an oxygen-containing gas supply unit for mixing an exhaust fuel gas consumed in reaction at said anode and discharged from said fuel gas channel, with the oxygen-containing gas before consumption, and supplying the mixed gas to said oxygen-containing gas channel;

an exhaust gas channel for discharging the fuel gas and the oxygen-containing gas consumed in the reaction in said electrolyte electrode assembly as an exhaust gas in a stacking direction of said electrolyte electrode assembly and said separators, wherein said fuel gas supply unit for supplying the fuel gas before consumption in the stacking direction is provided hermetically inside said exhaust gas channel; and said fuel gas supply channel connects said fuel gas channel and said fuel gas supply unit, and is provided along the separator surface that intersects said exhaust gas channel extending in the stacking direction.

10. A fuel cell according to claim 1, wherein the separators have a generally trapezoidal shape.

* * * * *